Dec. 4, 1956 D. AGER Re. 24,245

ROOF GUTTER

Original Filed Dec. 6, 1951 2 Sheets-Sheet 1

INVENTOR.
DREZ AGER
BY Stewart Blackman
ATTORNEY

Dec. 4, 1956 D. AGER Re. 24,245

ROOF GUTTER

Original Filed Dec. 6, 1951 2 Sheets-Sheet 2

INVENTOR.
DREZ AGER
BY Stanwood Blackmer
Attorney

United States Patent Office

Re. 24,245
Reissued Dec. 4, 1956

24,245

ROOF GUTTER

Drez Ager, Miami Beach, Fla.

Original No. 2,646,011, dated July 21, 1953, Serial No. 260,235, December 6, 1951. Application for reissue April 5, 1955, Serial No. 499,544

3 Claims. (Cl. 108—28)

Figure 1:
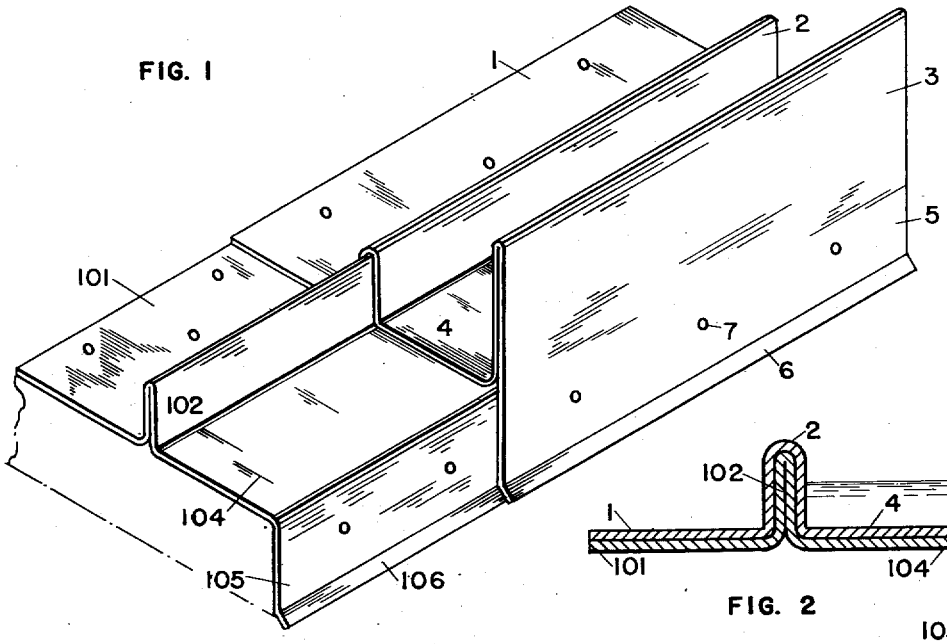

Matter enclosed in heavy brackets [ ] appears in the original patent but forms no part of this reissue specification; matter printed in italics indicates the additions made by reissue.

This invention relates to roof gutters and, more particularly, to an improvement in roof gutter construction for flat roofs not provided with parapet structures.

An object of the invention is to provide a gutter assembly having adjustable outlet or spillway means which may be conveniently installed and maintained.

A further object is to provide a roof gutter assembly which may be readily and economically fabricated.

Another object of the invention is to provide roof gutter construction which will effectively prevent the staining of the building walls by water leaking thereupon or the deterioration of adjacent building structure from the defective diversion of water conveyed by the gutters.

Still another object is to provide roof gutter construction to permit the efficient accommodation thereof to spillway points and conventional leader installations therefrom.

Other advantages of the invention will be discernible from the detailed description thereof hereinafter set forth.

According to the invention, the roof gutter assembly comprises a trough section and a spillway section extensible therefrom. These sections are formed from a single sheet for each unit, bent along fold lines longitudinally of the gutter to define an anchor strip adapted to underlie the adjacent roof covering, a stop member pleat to receive the roof covering, such as gravel or the like, thereagainst, a trough bottom, a frontal pleat forming with the stop member pleat and trough bottom a continuous roof gutter, and a spillway or outlet section having corresponding members adapted to underlie and abut the gutter or trough section members whereby to permit the slideable extension of the two sections relative to each other to adjust their installation along the roof edges. The frontal pleat terminates along the bottom thereof in a skirt or facia plate extending below the trough bottom [and having a bottom marginal outturned flange to direct overflow water away from the building wall.] *whereby to define a flashing member.* The spillway is adapted to discharge into the head portion of a conventional leader to carry the water flow to ground.

The invention is embodied in roof gutter construction which is exemplified in the accompanying drawings wherein the views are as follows, like reference numerals designating identical parts throughout the several views.

Figure 2:
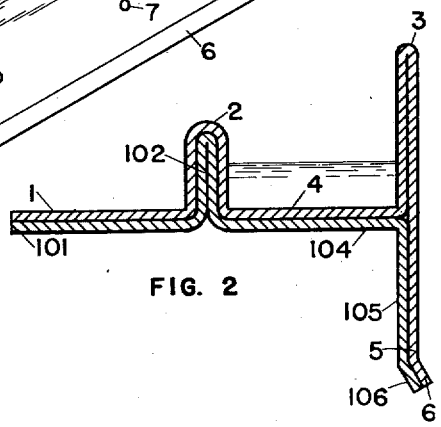
Figure 3:
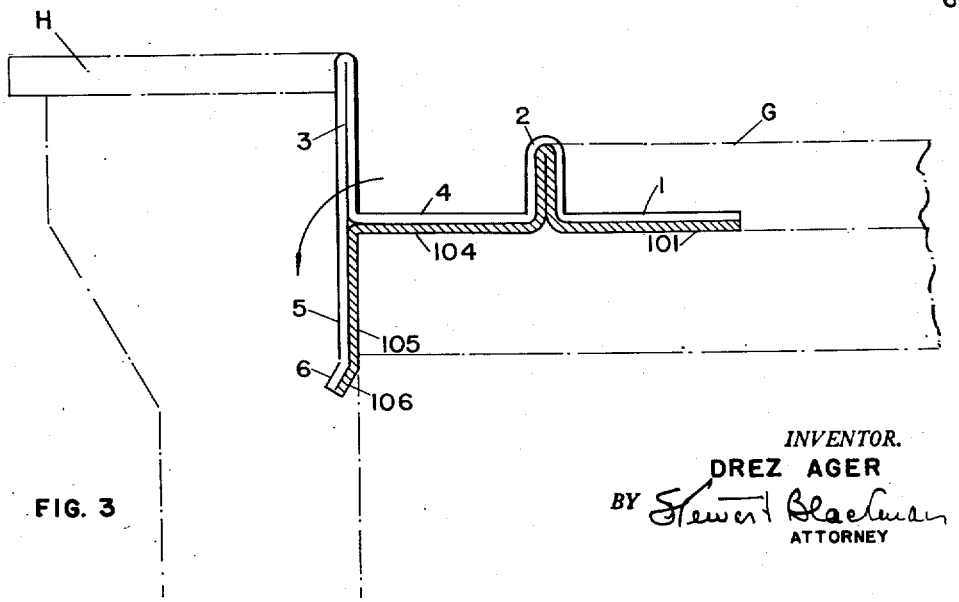
Figure 4:
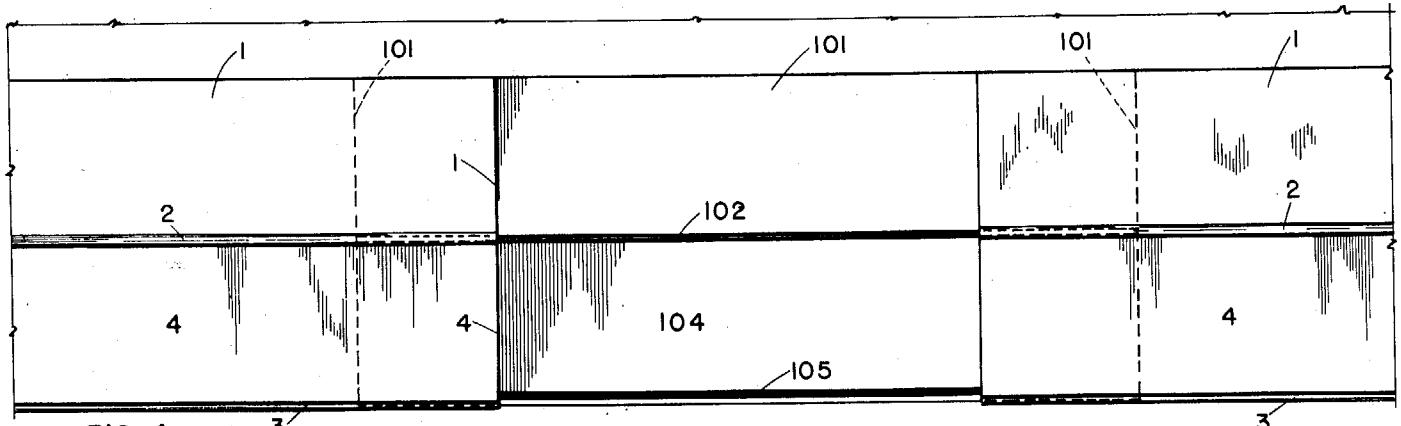
Figure 5:
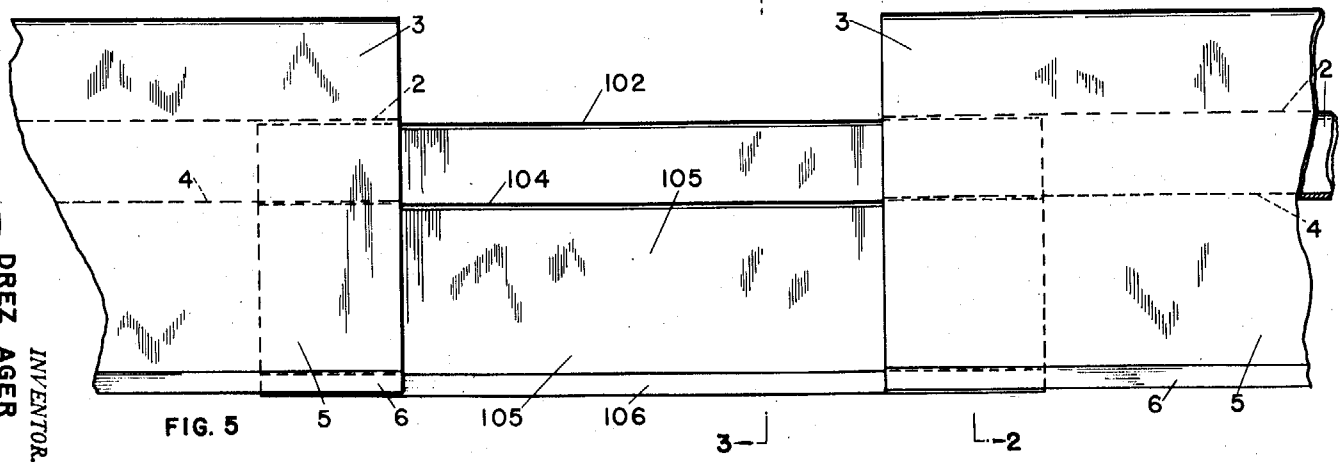

Fig. 1, an isometric view of the assembly arrangement of the trough and spillway sections of the roof gutter construction;

Fig. 2, a section on line 2—2, Fig. 5;

Fig. 3, a section on line 3—3, Fig. 5;

Fig. 4, a plan of the spillway and gutter assembly, and

Fig. 5, a front elevation of the view shown in Fig. 4.

Referring now to the accompanying drawings, the trough section of the gutter assembly is formed from a single elongated sheet which is bent along fold lines running longitudinally of the gutter so as to provide an anchor strip 1. This strip is adapted to underlie the marginal edge portion (Fig. 3) of the adjacent roof covering shown at G, which may be of the usual membrane waterproofing and gravel wearing course common to flat type roof construction.

The anchor strip 1 terminates along its front edge in an upstanding pleat 2 formed from the forward continuation of the material forming the anchor strip (Figs. 2 and 3), and this pleat functions as a stop member to receive thereagainst the adjacent roof covering G. The forward fold of the pleat 2 is extended forwardly in a common horizontal plane with the anchor strip 1 to define the trough bottom 4 and this bottom member is now bent upwardly along the forward edge thereof to begin a second upstanding pleat 3. The pleat 3 rises relatively higher than the stop member pleat 2 to form the forward wall of the trough and confine the water collecting along the gutter, therebehind, Fig. 2.

The pleat 3 now has its forward fold extended downwardly below the level of the trough bottom to define a facia plate 5 which [terminates] *may be terminated* along its bottom edge in a forwardly and downwardly inclined marginal flange 6.

The lower portion of the facia plate 5 constitutes a protective flashing member to prevent, in common with the marginal flange 6, the overflow water from overhead being directed against the wall surface below and staining the same, at the same time that this water is prevented from ingress into timbers or other internal structure making up the roof members.

Co-operatively associated with the trough section thus far described, is a spillway section adapted to abut the end of the trough section for the reception of water therefrom. This spillway has an anchor strip 101, an upright stop member pleat 102 designed for slideable reception within the folds of pleat member 2 of the trough section, a spillway or trough bottom 104 and a flashing member 105 [terminating] *which may be terminated* along the bottom thereof in an out-turned marginal flange 106. These spillway elements underlie and abut corresponding elements in the trough section from which they are slideably extensible so as to adjust the width and location of the spillway relative to the gutter section therewith associated. Thus, the spillway may be positioned so as to discharge water delivered thereto by the trough section into the conventional head (Fig. 3) of a leader conducting the water downward to ground or sub-surface drainage facilitates, as by the leader conduit H.

Suitable soldered-head nails may be employed through holes 7 in the flashing and anchor strip members, to secure the gutter sections to adjacent roof structure and soldered joints in a manner well known in the art may be used to connect adjoining edges of the sections.

The invention is thus seen to provide a roof gutter assembly meeting the objectives hereinabove set forth and affording the craftsman a convenient and easily adjusted roof drainage means which may be brought onto the work in standard cut lengths and sizes.

I claim:

[1. In a roof gutter assembly, a trough section formed from a single elongated sheet bent along parallel fold lines longitudinally thereof to define a rear anchor strip adapted to underlie the marginal edge portion of a roof covering, a rear upstanding pleat formed by the frontal continuation of said anchor strip to define a stop member receiving said roof covering thereagainst, a trough bottom disposed in a common horizontal plane with said anchor strip and formed from the forward continuation of said rear pleat, a front upstanding pleat spaced forwardly of said rear pleat and formed from the frontal continuation of said trough bottom to define, in common with said rear pleat and said trough bottom, a continuous water-collecting gutter, said front pleat rising higher than said rear pleat to define a barrier confining said water therebehind, said front pleat including a downwardly directed fold extending below said trough bottom and terminating along the bottom edge thereof in an outwardly and downwardly inclined marginal flange whereby to define a flashing member.]

[2. The invention as defined in claim 1, and: a spillway section adapted to abut said trough section endwise thereof for the reception of said water therefrom, said spillway section being formed from a single sheet bent along fold lines extensible from the fold lines of said trough section to lie in substantially parallel relation thereto, an anchor strip, rear pleat, trough bottom and flashing plate being formed by said spillway section in partially underlying and abutting relation to corresponding homologous parts of said trough section whereby said spillway section forms an extensible extension therefrom in slideable relation thereto, means to secure said trough section and spillway section to adjacent roofing structure.]

[3. The invention as defined in claim 1, and: a spillway section in endwise abutting relation to said trough section for reception of said water therefrom, said spillway section having an anchor strip, stop member pleat, trough bottom, flashing plate and marginal flange therefor, each adapted to partially underlie corresponding parts of said trough section in slideable relation therewith to permit the longitudinal adjustment of said spillway section relative to said trough section.]

*4. In a roof gutter assembly, a trough section formed from a single elongated sheet bent along parallel fold lines longitudinally thereof to define a rear anchor strip adapted to underlie the marginal edge portion of a roof covering, a rear upstanding pleat formed by the frontal continuation of said anchor strip to define a stop member receiving said roof covering thereagainst, a trough bottom disposed in a common horizontal plane with said anchor strip and formed from the forward continuation of said rear pleat, a front upstanding pleat spaced forwardly of said rear pleat and formed from the frontal continuation of said trough bottom to define, in common with said rear pleat and said trough bottom, a continuous water-collecting gutter, said front pleat rising higher than said rear pleat to define a barrier confining said water therebehind, said front pleat including a downwardly directed fold extending below said trough bottom whereby to define a flashing member, a spillway section adapted to abut said trough section endwise thereof for the reception of said water therefrom, said spillway section being formed from a single sheet bent along fold lines extensible from the fold lines of said trough section to lie in substantially parallel relation thereto, an anchor strip, rear pleat, trough bottom and flashing plate being formed by said spillway section in partially underlying and abutting relation to corresponding homologous parts of said trough section whereby said spillway section forms an extensible extension therefrom in slideable relation thereto, means to secure said trough section and spillway section to adjacent roofing structure.*

*5. In a roof gutter assembly, a trough section formed from a single elongated sheet bent along parallel fold lines longitudinally thereof to define a rear anchor strip adapted to underlie the marginal edge portion of a roof covering, a rear upstanding pleat formed by the frontal continuation of said anchor strip to define a stop member receiving said roof covering thereagainst, a trough bottom disposed in a common horizontal plane with said anchor strip and formed from the forward continuation of said rear pleat, a front upstanding pleat spaced forwardly of said rear pleat and formed from the frontal continuation of said trough bottom to define, in common with said rear pleat and said trough bottom, a continuous water-collecting gutter, said front pleat rising higher than said rear pleat to define a barrier confining said water therebehind, said front pleat including a downwardly directed fold extending below said trough bottom whereby to define a flashing member, a spillway section in endwise abutting relation to said trough section for reception of said water therefrom, said spillway section having an anchor strip, stop member pleat, trough bottom, and flashing member each adapted to partially underlie corresponding parts of said trough section in slideable relation therewith to permit the longitudinal adjustment of said spillway section relative to said trough section.*

*6. In a roof gutter assembly having a trough section including a rear anchor strip adapted to underlie the marginal edge portion of a roof covering, a rear upstanding pleat, a front upstanding pleat spaced forwardly therefrom and a trough bottom intervening therebetween, said front pleat including a downwardly directed fold extending below said trough bottom to define a flashing member, the combination with said trough section, of a spillway section in endwise abutting relation therewith for the reception of water therefrom, said spillway section having an anchor strip, rear pleat, trough bottom, and flashing member each adapted to partially underlie corresponding parts of said trough section in slideable relation therewith to permit the longitudinal adjustment of said spillway section relative to said trough section.*

References Cited in the file of this patent or the original patent

UNITED STATES PATENTS

| | | |
|---|---|---|
| Re. 9,314 | Foster | July 20, 1880 |
| 1,013,194 | Mathes | Jan. 2, 1912 |
| 2,421,978 | Andrews | June 10, 1947 |